United States Patent Office 3,641,052
Patented Feb. 8, 1972

3,641,052
MONO- AND DI-HALO-1-N-HETEROCYCLOVINYL PHOSPHATES
Robert T. Kemp, Richmond, Va., assignor to Mobil Oil Corporation
No Drawing. Filed Nov. 1, 1968, Ser. No. 772,819
Int. Cl. C07d 49/18
U.S. Cl. 260—310 R                    6 Claims

ABSTRACT OF THE DISCLOSURE

Mono- and di-halovinyl phosphate esters substituted in the 1-position with pyrazolyl or benzopyrazolyl groups and ring-substituted derivatives form a new class of insecticides. They are highly effective against Lepidoptera, particularly the Noctuidae.

BACKGROUND OF THE INVENTION

Field of the invention

This invention is directed to novel phosphate ester insecticides. It is more particularly concerned with mono- and dihalovinyl phosphate esters having nitrogen-containing aromatic heterocyclic substituents in the 1-position.

Description of the prior art

As is well known to those skilled in the art, Noctuidae (Lepidoptera), such as the Southern armyworm, cause widespread economic loss by the destruction of exposed crop plant leaves. Control of this class of insects has been very difficult and relatively few compounds have been effective against them. Indeed, many compounds have been proposed that exhibit good insecticidal properties, but have little or no effectiveness against the Noctuidae. In U.S. Pat. No. 3,183,258, there are disclosed as insecticides, 2,2-dichlorovinyl phosphate esters substituted in the 1-position with pyrrolidonyl or imidazolidonyl (two nitrogens separated by >C=O). Although these compounds have insecticidal activity, particularly Homoptera and Coleoptera, they are not effective against the Lepidoptera (Noctuidae). The compounds of this invention, on the other hand, are highly effective against the Noctuidae.

SUMMARY OF THE INVENTION

This invention provides compounds having the formula:

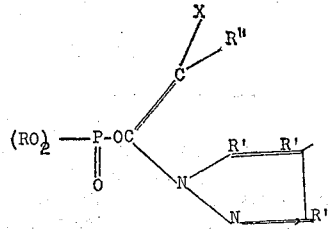

wherein X is halogen and R" is hydrogen or halogen, R is lower alkyl ($C_1$–$C_3$), R' is hydrogen, alkyl ($C_1$–$C_8$), alkenyl ($C_2$–$C_8$), phenyl, halogen, amino, nitro, alkoxycarbonyl, alkoxy ($C_1$–$C_3$), alkylthio ($C_1$–$C_3$), or trifluoromethyl and adjacent R' radicals can join to form a condensed benzo ring; their use as insecticides; and insecticidal compositions comprising at least one such compound and a carrier therefor.

DESCRIPTION OF SPECIFIC EMBODIMENTS

As will be noted from the formula the heterocyclic substituent in the compounds of this invention must have two adjacent N atoms. Thus, the substituents will be pyrazolyl or benzopyrazolyl and ring substituted derivatives. Non-limiting examples of the compounds of this invention include diethyl 2,2-dichloro-1-pyrazolylvinyl phosphate;
dimethyl 2-chloro-1-pyrazolylvinyl phosphate;
dimethyl 2,2-dichloro-1-(3-t-butylpyrazolyl)vinyl phosphate;
dipropyl 2-bromo-1-(5-phenylpyrazolyl)vinyl phosphate;
dimethyl 2,2-dichloro-1-(5-methoxypyrazolyl)vinyl phosphate;
dimethyl 2-chloro-1-(5-nitropyrazolyl)vinyl phosphate;
diethyl 2,2-dichloro-1-(5-propenylpyrazolyl)vinyl phosphate;
dimethyl 2,2-bromo-1-(3-phenylpyrazolyl)vinyl phosphate;
diethyl 2,2-dichloro-1-(5-amino-3-phenylpyrazolyl)vinyl phosphate;
dimethyl 2,2-dibromo-1-(4-amino-3,5-dimethylpyrazolyl) vinyl phosphate;
dimethyl 2,2-dichloro-1-(4-bromopyrazolyl)vinyl phosphate;
dimethyl 2,2-dichloro-1-(4-nitropyrazolyl)vinyl phosphate;
diethyl 2,2-dichloro-1-(5-bromopyrazolyl)vinyl phosphate;
dipropyl 2,2-dichloro-1-(3-ethylthiopyrazolyl)vinyl phosphate;
dimethyl 2,2-diiodo-1-(3-ethoxycarbonylpyrazolyl)vinyl phosphate;
diethyl 2,2-dichloro-1-(3-trifluoromethylpyrazolyl)vinyl phosphate;
dimethyl 2,2-dichloro-1-pyrazolyl-vinyl phosphate;
diethyl 2,2-dichloro-1-(3,5-dimethylpyrazolyl)vinyl phosphate;
dimethyl 2,2-dichloro-1-(3,5-dimethylpyrazolyl)vinyl phosphate;
diethyl 2,2-dichloro-1-(5-methylpyrazolyl)vinyl phosphate;
dimethyl 2,2-dichloro-1-benzopyrazolylvinyl phosphate;
diethyl 2,2-bromo-1-(3-chloro-6-nitrobenzopyrazolyl) phosphate;
dimethyl 2-chloro-1-(7-methylbenzopyrazolyl)vinyl phosphate; and
dimethyl 2,2-dichloro-1-(7-methylbenzopyrazolyl)vinyl phosphate.

The compounds of this invention are readily prepared in two steps. In the first step the pyrazole, benzopyrazole, or ring-substituted derivatives are reacted with trihaloacetyl chloride or dihaloacetyl chloride preferably in a solvent, such as chloroform, diethyl ether, trichloroethylene, carbon tetrachloride, etc. The trihaloacetyl chloride or dihaloacetyl chloride is stirred dropwise into the heterocyclic compound at temperatures of 30–100° C. As HCl is formed it is removed, preferably with a basic HCl acceptor such as triethylamine and pyridine. The by-product amine hydrohalide is removed by filtration.

In the second step, the halovinyl phosphate ester derivative is formed by reacting a lower trialkyl phosphite with the product of the first step by adding the trialkyl phosphite dropwise. As the reaction is exothermic, it is preferred to cool the reaction mixture to 5–10° C. in an ice bath, although the reaction has been reported to have been carried out at 90–110° C. Removal of the solvent, as by distillation or evaporation, leaves the desired phosphate ester.

The following examples demonstrate the typical procedures, as illustrated with pyrazole.

EXAMPLE 1

A solution of 68 g. (1 mole) pyrazole and 101 g. (1 mole) triethylamine in about 1500 ml. ether was placed in a reaction vessel. Trichloroacetyl chloride (163 g., 1 mole) was added dropwise at a rate affording light reflux of ether from the exothermic reaction. After addition was completed, refluxing was continued for about 10 minutes and the mixture was cooled and let stand for an hour. The triethylammonium chloride by-product was removed by filtration, leaving a filtrate containing a mole of 1-trichloroacetylpyrazole in ether solution.

EXAMPLE 2

To the filtrate from Example 1, 166 g. (1 mole) triethyl phosphite was added dropwise, while holding the reaction temperature at 5–10° C. by ice-cooling. After addition was complete, the reaction mixture was warmed to room temperature and let stand for an hour. Then, the ether was stripped by distillation in a $N_2$ atmosphere to 60° C. The product, diethyl 2,2-dichloro-1-pyrazolylvinyl phosphate, was obtained in stoichiometric yield.

Using the general procedure described in Examples 1 and 2, other derivatives were prepared, as identified in the following tabulation (Examples 9–11 are for comparison):

Example: Compound
(3)—Dimethyl 2,2-dichloro-1-pyrazolylvinyl phosphate
(4)—Diethyl 2,2-dichloro-1-(3-methylpyrazolyl)-vinyl phosphate
(5)—Dimethyl 2,2-dichloro-1-(3,5-dimethylpyrazolyl)vinyl phosphate
(6)—Diethyl 2,2-dichloro-1-(3,5-dimethylpyrazolyl)vinyl phosphate
(7)—Diethyl 2,2-dichloro-1-(3-chloro-6-nitrobenzopyrazolyl)vinyl phosphate
(8)—Diethyl 2-chloro-1-pyrazolyl vinyl phosphate
(9)—Diethyl 2,2-dichloro-1-imidazolylvinyl phosphate
(10)—Dimethyl 2,2-dichloro-1-($\alpha$-pyrrolidinyl)-vinyl phosphate
(11)—Dimethyl 2,2-dichloro-1-imidazolidonylvinyl phosphate Compounds 2 through 11 were subjected to the following insecticidal tests. The results are set forth in the table following the test descriptions.

leaf. Leaves with mites attached are momentarily dipped into a 500 p.p.m. emulsion, solution, or suspension of the test compound and then placed (petiole only) in a 4 oz. bottle of water for observation. Percent mortality is observed after 72 hours. If 90–100 percent mortality is observed, compounds are retested at 100 and 10 p.p.m.

SPRAY TESTS

Housefly—*Musca domestica* Linnaeus

Adult houseflies are contained in 100 mm. petri dish screened cages and exposed to a spray of 10 ml. acetone solution of test compound. An initial concentration of 500 p.p.m. is used, with ten flies in each cage. Percent mortality is observed after 24 hours. When over 90 percent mortality is observed, the compound is retested at lower concentrations.

German cockroach—*Blattella germanic* Linnaeus

This test is conducted in a manner similar to that used for the housefly. The test specimens are 10 cockroaches per screened petri dish.

Bean aphid—*Aphis fabae*

This test is conducted in a manner similar to that used for the housefly. The test specimens are Nasturtium leaves infested with bean aphids.

Boll weevil—*Anthonomus grandis*

This test is conducted in a manner similar to that used for the housefly. The test specimens are 10 boll weevils per screened petri dish.

Mosquito larvae—*Aedes aegypti* Linnaeus

Early fourth stage larvae are exposed to solutions, emulsions, or suspensions of the test compound in water. The compound are dissolved in acetone and added to jars of distilled water containing the larvae. Water-soluble compounds remain in solutions and the others form finely divided suspensions. Compounds are initially tested at 1 p.p.m. using ten larvae per 100 ml. water. Percent of mortality is observed after 24 hours. If 90–100 percent mortality occurs, compounds are retested at 0.1 and 0.01 p.p.m. Results are reported: p.p.m. conc./percent kill.

TABLE

| Compound of example | German roach p.p.m. | | | Housefly, p.p.m. | | | Bean aphid, p.p.m. | | | Boll weevil, p.p.m. | | | Mosquito larvae, p.p.m. | | | Southern armyworm, p.p.m. | | | Mexican bean beatle, p.p.m. | | | Two-spotted spider mite, p.p.m. | | |
|---|---|---|---|---|---|---|---|---|---|---|---|---|---|---|---|---|---|---|---|---|---|---|---|---|
| | 500 | 100 | 10 | 500 | 100 | 10 | 500 | 100 | 10 | 500 | 100 | 10 | 1.0 | 0.1 | 0.01 | 500 | 100 | 10 | 500 | 100 | 10 | 500 | 100 | 10 |
| 2 | 100 | 100 | 0 | 100 | 80 | 0 | 100 | 100 | 100 | 100 | 20 | 0 | 100 | 90 | 80 | 100 | 100 | 30 | 100 | 100 | 80 | 90 | 90 | 30 |
| 3 | 100 | 100 | 0 | 100 | 100 | 30 | 100 | 100 | 100 | 100 | 80 | 60 | 100 | 100 | 30 | 100 | 60 | 40 | 100 | 100 | 80 | 100 | 30 | 20 |
| 4 | 100 | 100 | | 100 | 50 | 0 | 100 | 100 | | 100 | 20 | | 100 | 20 | | 100 | 20 | | 100 | 100 | | 70 | 0 | |
| 5 | 100 | 30 | 0 | 100 | 100 | 0 | 100 | 100 | 50 | 100 | 40 | 0 | 100 | 80 | 50 | 70 | | | 100 | 100 | 40 | 20 | | |
| 6 | 100 | 70 | 0 | 100 | 70 | 0 | 100 | 100 | 30 | 90 | 20 | 20 | 100 | 30 | 20 | 100 | 40 | 40 | 100 | 100 | 100 | 100 | 20 | 0 |
| 7 | | | | 0 | | | 30 | | | 30 | | | 40 | | | 100 | | | 100 | 100 | 80 | 90 | 30 | 0 |
| 8 | 100 | | | 100 | 20 | | 100 | 20 | | 100 | | | | | | 100 | | | 100 | | | 100 | | |
| 9 | | | | 30 | | | 100 | 50 | 20 | 100 | 20 | 0 | 50 | | | 0 | | | 100 | 80 | 40 | 100 | 50 | 0 |
| 10 | | | | 100 | 30 | 0 | 100 | 100 | 60 | 100 | 100 | 20 | 100 | 60 | 40 | 0 | | | 100 | 100 | 100 | 90 | 90 | 90 |
| 11 | 20 | | | 30 | | | 100 | 80 | 0 | 20 | | | 100 | 100 | 70 | 0 | | | 100 | 100 | 0 | 90 | 80 | 40 |

INSECTICIDE TESTING METHODS.—DIP TEST

Mexican bean beatle—*Epilichna varivestis* Mulsant

Lima bean leaves of uniform size are momentarily dipped in a 500 p.p.m. water-acetone solution of the test compound. When dry, the treated leaf is placed in a screened petri dish and exposed to 10 fourth instar larvae. The percent mortality is recorded after 48 hours. Compounds that show 90 percent or more mortality are retested at 100 and 10 p.p.m.

Southern Armyworm—*Prodenia eridania* Cramer

This test is carried out as described for the Mexican bean beatle, using 10 fourth instar larvae and observing mortality after 48 hours.

Two-spotted spider mite—*Tetranychus telarius* Linnaeus

Infested trifoliate bean leaves (Henderson bush lima) are selected that have as many as twenty adult mites per From the data in the table, it will be noted that the phosphate esters of this invention have a broad range of insecticidal activity. They are effective against Lepidoptera (Southern armyworm). On the other hand, compounds having only one nitrogen in the ring (Example 10) and those having two nitrogens that are not adjacent (Examples 9 and 11) are totally ineffective against the Southern armyworm.

The compounds of this invention have been found to exhibit considerable biological activity and are especially potent insecticides when used against important agricultural pests. These compounds may be used in various ways to achieve biological action. They can be applied per se, as solids or in vaporized form, but are preferably applied as the toxic components in pesticidal compositions of the compound and a carrier. The compositions can be applied as dusts, as liquid sprays, or as gas-propelled sprays and can contain, in addition to a carrier, additives such as emulsifying agents, wetting agents, binding agents, gases compressed to the liquid state, odorants, stabilizers and the like. A wide variety of liquid and solid carriers can be used in the pesticidal compositions. Non-limiting examples of liquid carriers include water; organic solvents such as alcohols, ketones, amides, and esters; mineral oils such as kerosene, light oils, and medium oils; and vegetable oils such as cottonseed oil. Non-limiting examples of solid carriers include talc, bentonite, diamtomaceous earth, pyrophyllite, fullers earth, gypsum, flours derived from cotton seeds and nut shells, and various natural and synthetic clays having a pH not exceeding about 9.5.

The amount of the compounds of this invention utilized in pesticidal compositions will vary rather widely. It depends to some extent upon the type of composition in which the material is being used, the nature of the condition to be controlled, and the method of application (i.e., spraying, dusting, etc.). In the ultimate pesticidal composition, as applied in the field, pesticide concentrations as low as 0.0001 weight percent of the total composition can be used. In general, compositions, as applied, containing about 0.05 weight percent pesticide in either liquid or solid carrier give excellent results. In some cases, however, stronger dosages up to about 10 weight percent may be required.

In practice, pesticidal compositions are usually prepared in the form of concentrates, which are diluted in the field to the concentration desired for application. For example, the concentrate can be a wettable powder containing large amounts of a compound of this invention, a carrier (e.g., attapulgite or other clay), and wetting and dispersing agents. Such a powder can be diluted prior to application, by dispersing it in water to obtain a sprayable suspension containing the concentration of pesticide desired for application. Other concentrates can be solutions that can be later diluted, e.g., with kerosene. Thus, it is within the contemplation of this invention to provide pesticidal compositions containing up to about 80 percent, by weight of the composition, of a pesticidal compound of this invention. Accordingly, depending upon whether it is ready for application or it is in concentrated form, the contemplated pesticidal compositions contain between about 0.0001 percent and about 80 percent, by weight of the composition, of a pesticidal compound of this invention, and a carrier, liquid or solid, as defined hereinbefore.

Although the present invention has been described with preferred embodiments, it is to be understood that modifications and variations may be resorted to, without departing from the spirit and scope of the invention, as those skilled in the art will readily understood. Such variations and modifications are considered to be within the purview and scope of the appended claims.

What is claimed is:
1. A compound having the formula:

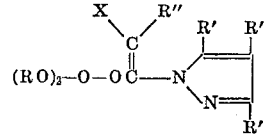

wherein X is halogen and R" is hydrogen or halogen, R is lower alkyl of 1–3 carbon atoms, R' is hydrogen, alkyl of 1–8 carbon atoms, alkenyl of 2–8 carbon atoms, phenyl, halogen, amino, nitro, lower alkoxycarbonyl, alkoxy of 1–3 carbon atoms, alkylthio of 1–3 carbon atoms, or trifluoromethyl and adjacent R' radicals can join with the carbon atoms of the pyrazolyl ring to which they are attached to form a condensed benzo ring of 6 carbon atoms which is unsubstituted or has a nitro group in the 6-position or a methyl group in the 7-position.

2. Diethyl 2,2-dichloro-1-pyrazolylvinyl phosphate.
3. Dimethyl 2,2-dichloro-1-pyrazolylvinyl phosphate.
4. Diethyl 2,2-dichloro-1-(3,5-dimethylpyrazoly)vinyl phosphate.
5. Diethyl 2,2-dichloro-1-(3-chloro-6-nitrobenzopyrazolyl)vinyl phosphate.
6. Diethyl 2-chloro-1-pyrazolylvinyl phosphate.

References Cited

UNITED STATES PATENTS

| | | | |
|---|---|---|---|
| 2,914,530 | 11/1959 | Schrader et al. | 260—248 |
| 3,102,842 | 9/1963 | Phillips et al. | 260—957 |
| 3,111,525 | 11/1963 | Meltzer et al. | 260—310 C |
| 3,174,990 | 3/1965 | Ward et al. | 260—957 |
| 3,183,258 | 5/1965 | Schuler et al. | 260—309.7 |

FOREIGN PATENTS

| | | | |
|---|---|---|---|
| 1,331,721 | 3/1963 | France | 260—310 C |

OTHER REFERENCES

Netherlands application 6509921, February 1966 (1 page drawing, 10 pages spec.) 260–963.

U.S. Cl. X.R.

260—309, 310 C, 326.5 A; 424—273, 274

PO-1050
(5/69)

UNITED STATES PATENT OFFICE
CERTIFICATE OF CORRECTION

Patent No. 3,641,052      Dated February 8, 1972

Inventor(s)     Robert T. Kemp

It is certified that error appears in the above-identified patent and that said Letters Patent are hereby corrected as shown below:

Column 3, line 59, Change "Epilichna" to --Epilachna--

Column 4, line 36, Change "The compound" to --The compounds--

Column 6, in the formula:

Change "$(RO)_2$--O--" to --$(RO)_2 \overset{\text{P}}{\underset{\text{O}}{\|}}$-- --

Signed and sealed this 4th day of July 1972.

(SEAL)
Attest:

EDWARD M. FLETCHER, JR.      ROBERT GOTTSCHALK
Attesting Officer             Commissioner of Patents